(12) United States Patent
Rottmerhusen

(10) Patent No.: US 9,590,538 B2
(45) Date of Patent: Mar. 7, 2017

(54) BRAKING DEVICE FOR A UNIVERSAL MOTOR

(75) Inventor: Hans Hermann Rottmerhusen, Tellingstedt (DE)

(73) Assignee: Robert Bosch GmbH, Stuttgart (DE)

( * ) Notice: Subject to any disclaimer, the term of this patent is extended or adjusted under 35 U.S.C. 154(b) by 829 days.

(21) Appl. No.: 13/518,799

(22) PCT Filed: Dec. 22, 2010

(86) PCT No.: PCT/EP2010/070457
§ 371 (c)(1),
(2), (4) Date: Aug. 29, 2012

(87) PCT Pub. No.: WO2011/076827
PCT Pub. Date: Jun. 30, 2011

(65) Prior Publication Data
US 2012/0319627 A1    Dec. 20, 2012

(30) Foreign Application Priority Data

Jan. 11, 2010    (DE) .................. 10 2010 004 311

(51) Int. Cl.
| | |
|---|---|
| H02P 3/12 | (2006.01) |
| H02P 3/00 | (2006.01) |
| H02P 3/22 | (2006.01) |
| H02P 25/10 | (2006.01) |
| H02P 25/14 | (2006.01) |

(52) U.S. Cl.
CPC ................ *H02P 3/22* (2013.01); *H02P 25/10* (2013.01); *H02P 25/14* (2013.01)

(58) Field of Classification Search
CPC ...... H02P 3/22; H02P 3/12; H02P 6/24; H02P 3/18; H02P 25/10; H02P 23/14; H02P 27/06; H02P 29/021; H02P 3/06; H02K 21/042; H02M 1/32
USPC ......... 310/220; 318/379, 362, 787, 381, 273
See application file for complete search history.

(56) References Cited

U.S. PATENT DOCUMENTS

| | | | | |
|---|---|---|---|---|
| 3,764,822 A * | 10/1973 | Ebbinge et al. | ............... | 307/141 |
| 6,013,993 A * | 1/2000 | Barbisch | ........................ | 318/379 |
| 6,208,113 B1 * | 3/2001 | Lelkes et al. | ................. | 318/807 |
| 6,236,177 B1 * | 5/2001 | Zick et al. | .................... | 318/362 |
| 8,028,549 B2 * | 10/2011 | Orue Orue et al. | ......... | 68/12.14 |
| 8,541,963 B2 * | 9/2013 | Rottmerhusen | ......... | H02P 25/14 318/273 |
| 2004/0130282 A1 * | 7/2004 | Meyer et al. | ................. | 318/362 |

(Continued)

FOREIGN PATENT DOCUMENTS

| | | |
|---|---|---|
| DE | 199 32 742 C1 | 9/2000 |
| DE | 103 17 636 A1 | 11/2004 |

(Continued)

*Primary Examiner* — Bentsu Ro
*Assistant Examiner* — Zemenay Truneh
(74) *Attorney, Agent, or Firm* — Maginot, Moore & Beck LLP

(57) ABSTRACT

An electrodynamic braking device for a universal motor includes a field winding configured to be fed from a grid during a braking operation, and an armature that is configured to be directly short-circuited. A braking process is performed by means of control electronics. Good braking is achieved with relatively low brush wear. Such an electrodynamic braking device can be used effectively for a power tool.

16 Claims, 3 Drawing Sheets

(56) References Cited

U.S. PATENT DOCUMENTS

2008/0077285 A1* 3/2008 Kumar et al. .................. 701/19

FOREIGN PATENT DOCUMENTS

| EP | 0 578 366 A2 | 1/1994 |
|---|---|---|
| EP | 1 385 261 A2 | 1/2004 |
| JP | 59-92785 A | 5/1984 |
| JP | 2002-153087 A | 5/2002 |

* cited by examiner

BRAKING DEVICE FOR A UNIVERSAL MOTOR

This application is a 35 U.S.C. §371 National Stage Application of PCT/EP2010/070457, filed on Dec. 22, 2010, which claims the benefit of priority to Ser. Nos. DE 10 2009 060 139.2, filed on Dec. 23, 2009 in Germany and DE 10 2010 004 311.7, filed on Jan. 11, 2010 in Germany, the disclosures of which are incorporated herein by reference in their entirety.

The disclosure relates to a braking device for a universal motor and to a braking method.

BACKGROUND

Electrodynamic braking devices are known in different configurations.

U.S. Pat. No. 6,236,177 B1 describes a braking and control circuit for a universal motor, in which, on the one hand, a first switching means (triac) for operating the motor is connected in series with the motor, and, on the other hand, a second switching means (triac) for braking the motor is connected parallel to the armature, wherein the armature is arranged between the field winding. During the motor mode, the second switching means parallel to the armature is not conductive, and during the braking mode both the first switching means and the second switching means are actuated.

EP 0 578 366 A2 describes a braking device for universal motors, in which switching means are used to connect and/or disconnect the field winding and the rotor winding to and respectively from the power grid, wherein the switching means have positions in which in the first position the rotor winding and the field winding are connected to the power grid, and in the second position the rotor winding is short-circuited and the power grid is connected only to the field winding.

DE 103 17 636 A1 describes a braking device for a universal motor, in which a short-circuit switch (triac) is provided for short-circuiting the armature winding during the braking mode, wherein the short-circuit switch has a control input for determining its switched state, and the control input of the short-circuit switch is connected to a control unit in order to carry out phase-gating control of the short-circuit switch during the braking mode in order to avoid sparking.

SUMMARY

The disclosure is based on the object of providing an efficient and cost-effective electrodynamic braking device and a braking method for a universal motor, with which good braking can be achieved with preferably reduced sparking and preferably low brush wear.

The object of the disclosure is achieved by the means described herein.

An advantage of the disclosure is that an electrodynamic braking device is provided for a universal motor, having a device for switching from a motor mode into a braking mode, wherein during the braking mode a field winding of the universal motor is fed from a power grid via a first and a second switch, and an armature of the universal motor is short-circuited via the second switch, and having control electronics which are designed to briefly predefine a motor mode during the braking mode, preferably within each half cycle of the power grid voltage, and subsequently to predefine a braking mode, wherein to the first switch the second switch is energized with a predetermined delay. In this way, improved braking of the universal motor can be carried out.

In one development, the delay for actuating the second switch is configured in such a way that the preceding motor mode within a half cycle brings about a reduction in a sparking at the collector of the universal motor.

In one development of the braking device, the delay is between 1 µs and 1 ms. This value range has proven advantageous. Shorter times or longer times can also be used depending on the implementation.

In one development of the braking device, the delay for the actuation of the second switch after the first switch is constant during an entire braking operation.

In one development of the braking device, the delay for the actuation of the second switch after the first switch during the braking mode depends on parameters of the universal motor and of the power grid voltage. As a result, a braking operation which is more precisely adapted can be achieved. In particular, the braking time and the loading of the collector, in particular of the brushes, can be optimized.

In one development of the braking device, the delay for the actuation of the second switch after the first switch during the braking mode is dependent on the power grid voltage at the time of the switching of the first switch and/or dependent on the rotational speed of the universal motor and/or dependent on the temperature of the universal motor. This development permits even better adaptation of the braking process, for example to optimize the braking time and/or to reduce the loading of the collector, in particular of the brushes.

In one development of the braking device, the delay for the actuation of the second switch at the start of the braking mode has a value which decreases in the further course of the braking mode and in particular is eliminated at the end of the braking mode or in particular the second switch is closed before the first switch.

In one development of the braking device, the delay for the actuation of the second switch is selected such that commutation under brushes at the collector of the universal motor during the initiation of the braking mode within at least a portion of the half cycles is moved from a trailing edge of the brushes to a leading edge, wherein the armature is basically not driven, i.e. not accelerated, during the braking mode.

In one development of the braking device, the control electronics are designed to carry out the braking mode in an unregulated or regulated fashion.

In one development of the braking device, the control electronics access a table in which phase-gating angles for actuating the first and/or the second switch are stored, wherein preferably at least one phase-gating angle curve is stored.

In one development of the braking device, during the braking mode the second switch is connected parallel to the armature and in series with the field winding and in series with the first switch, a switching element preferably being connected upstream of the second switch, preferably with a detection contact.

In one development of the braking device, the switching element is assigned as a signal generator switching element to the control electronics, and the first switch is arranged in a first power grid connection, and a third switch is arranged in a second power grid connection.

Furthermore, the disclosure relates to a method for braking a universal motor having a device for switching the universal motor from a motor mode into a braking mode, wherein during the braking mode a field winding of the universal motor is fed from a power grid voltage via a first and a second switch, and an armature of the universal motor is short-circuited via the second switch, wherein during the braking mode a motor mode of the universal motor is set briefly preferably within each half cycle of the power grid voltage by switching the first switch, and wherein a braking mode is subsequently set with a delay by switching the second switch.

In one development of the method, the delay between the switching of the first switch for the motor mode and the switching of the second switch for the braking mode is between 1 µs and 1 ms. This value range has proven advantageous. Shorter times or longer times can also be used depending on the implementation.

In one development of the braking device, the delay for the actuation of the second switch after the first switch during the braking mode is dependent on the power grid voltage at the time of the switching of the first switch and/or dependent on a rotational speed of the universal motor and/or dependent on the temperature of the universal motor.

Further advantages of the disclosure are considered to be the following: without reversing the polarity of a field winding or of an armature, gentle high-speed braking of the universal motor is achieved with a good brush service life. The armature is short-circuited during the braking mode and the field winding is excited by specific actuation from a power grid voltage during the braking mode. Gentle high-speed braking is preferably achieved by means of simple hardware and special software, as a result of which the electrodynamic braking device is cost-effective.

The sparking at the collector of the armature can preferably be reduced during the braking mode in particular by virtue of the fact that a controller of control electronics contains a program with which a damaging build-up of an increased electric arc at the collector is reduced, in particular by virtue of the fact that a situation is prevented in which firstly a motor mode and subsequently the braking mode occur within a half cycle of a power grid voltage.

Furthermore, devices for reliably detecting the motor mode and the braking mode as well as monitoring the operational reliability of the control of electronics and of a circuit arrangement are preferably provided.

BRIEF DESCRIPTION OF THE DRAWINGS

The disclosure is explained in more detail below with reference to the drawing, in which.

DETAILED DESCRIPTION

Figure 1:
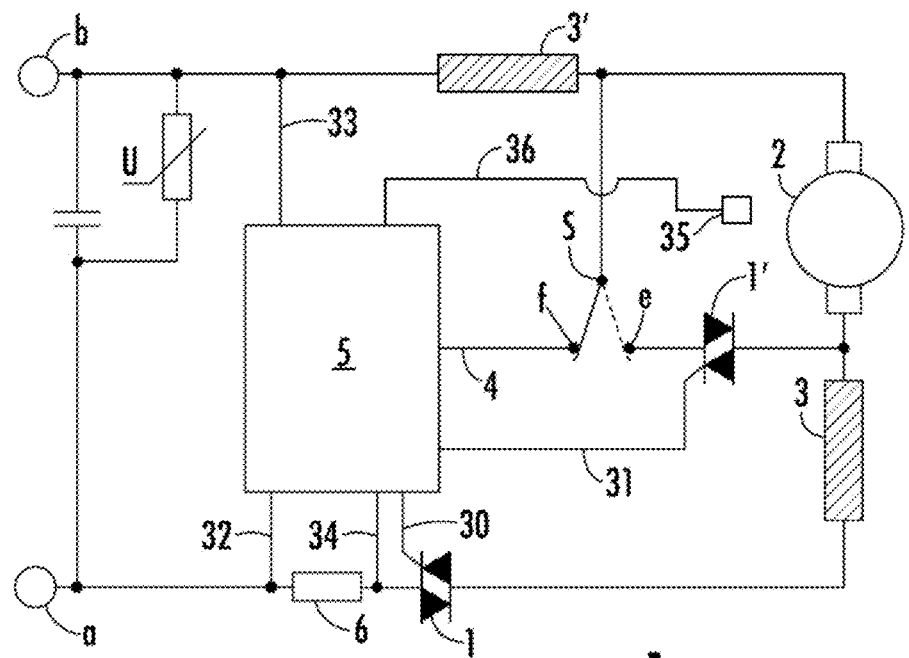
FIGS. 1 and 2 show circuit arrangements of the electrodynamic braking device for a universal motor.

FIG. 1 shows a circuit arrangement in which a first triac 1 is arranged in a first power grid connection a and is connected in series with the universal motor, and a second triac 1' is connected parallel to the armature 2, wherein a switching element S is connected upstream of the second triac 1' and is located in series with the second triac. The armature 2 is connected between two field windings 3, 3'. The switching element S is connected to one of the sides of the armature 2. The second triac 1' is connected by one of its sides to a braking mode contact e of the switching element S, and by its other side to the other side of the armature 2. A detection contact f of the switching element S is connected via a line 4 to control electronics 5. The control electronics 5 are connected to the first triac 1 via a first control line 30, and to the second triac 1' via a second control line 31. Furthermore, the control electronics 5 are connected to the first power grid connection via a first supply line 32, and to the second power grid connection b via a second supply line 33. In addition, a signal line 34 is led from the control electronics 5 to the connecting line between the shunt 6 and the first triac 1. Finally, further sensors 35, in particular a rotational speed meter or a temperature sensor for the universal motor may be provided, these being connected to the control electronics 5 via a further signal line 36.

During the motor mode, the switching element S is connected to the detection contact f, and the motor mode takes place via the first triac 1. During the braking mode, the switching element S is connected to the braking operation contact e, and the braking mode takes place both via the first triac 1 and via the second triac 1'.

It is possible to dispense with the switching element S. Furthermore, a signal generator switching element can be assigned to the control electronics 5. In this embodiment, the second triac 1' is connected to the two connections of the armature 2. Such a signal switch for reliably detecting the motor mode and the braking mode preferably has three connections.

In order to improve the braking process and, in particular, to reduce the sparking during the braking mode, the first and the second triac 1, 1' are specifically actuated with a program of a controller of the control electronics 5, wherein the program of the controller is configured in such a way that the first triac 1 is first actuated, i.e. energized, preferably during each half cycle of the power grid voltage, and this activates the motor mode. Here, although the term motor mode is used, since the supply voltage is correspondingly selected, a low preferably a small power grid voltage and, in particular, a short duration are selected such that no significant acceleration, and preferably no acceleration, of the universal motor occurs. As a result, a predefined brush setting permits optimum commutation to be achieved. After a predetermined delay, the second triac 1' is actuated, i.e. energized, with the result that the first triac 1 and the second triac 1' are conductive. As a result, the armature 2 is short-circuited via the second triac 1', and the current of the power grid flows directly via the field winding 3, 3' and via the first and the second triac 1, 1'. The induced current of the short-circuited armature 2 also flows via the second triac 1'. The reversal of the field at the armature during the braking mode causes insufficient commutation to occur at the armature as a result of the predefined brush setting.

Since a motor mode is still briefly present preferably in each case within every half cycle during the braking mode before the actual braking mode, the sparking is suppressed during the short-circuiting of the armature, and the sparking and therefore the brush wear are reduced.

The delay for the actuation of the second triac 1' is dimensioned in such a way that the motor mode is preferably sufficient for suppressing the sparking at the collector of the universal motor in every half cycle during the braking mode, but is not sufficient for driving the armature 2 in any appreciable way.

The delay for the actuation of the second triac 1' during each half cycle is preferably constant during the entire braking time, i.e. a braking process of the universal motor. However, the delay can also be variable during the braking mode. It is possible for a sufficiently long delay to be present at the start of the braking mode, wherein during the further course of the braking mode the delay preferably decreases continuously, for example from half cycle to half cycle, and at the end of the braking time the second triac 1' is fired directly after the first triac 1, or at the same time or even before the first triac 1. The universal motor can also be disconnected from the power grid on both sides.

Figure 2:
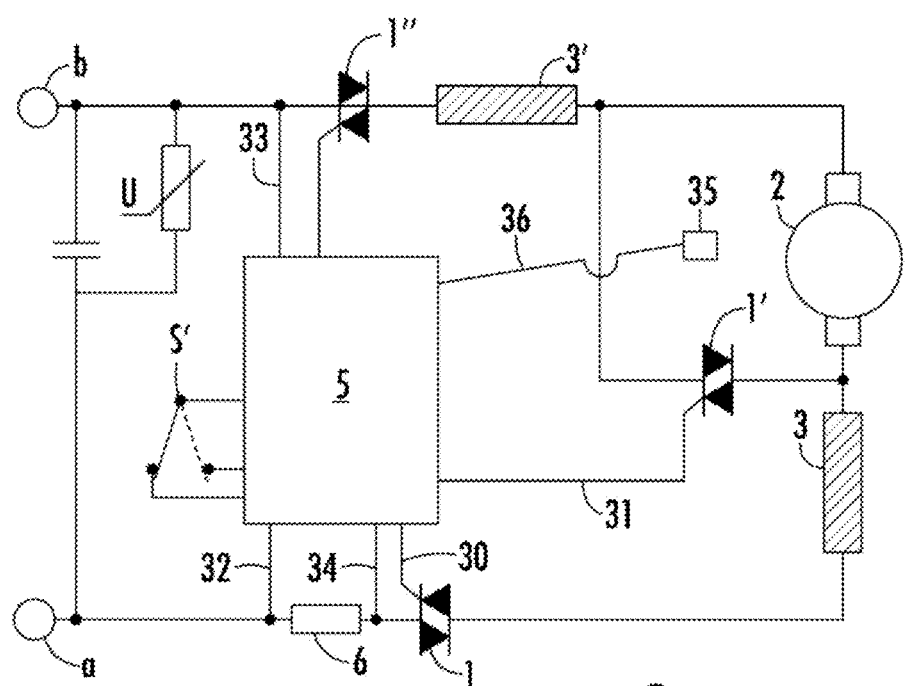

FIG. 2 shows a solution in which a third triac 1" is arranged in the second power grid connection b. The first and third triacs 1, 1" are always actuated simultaneously. Here, a signal switch S' for determining the motor mode and the braking mode are assigned to the control electronics 5.

The second triac 1', which is connected parallel to the armature 2, can be monitored by means of a shunt 6. If an excessively high flow of current is determined after the switching on of the universal motor, the second triac 1' is probably conductive and the universal motor is immediately disconnected from the power grid. In such a case, a warning light can flash.

In the exemplary embodiments described, triacs are used as semiconductor switches. Depending on the embodiment selected, other switches, in particular other semiconductor switches, can also be used to control the voltage supply and power supply of the universal motor for the motor mode and the braking mode.

The previously described electrodynamic braking device is particularly characterized by good commutation under the brushes at the collector of the universal motor during the braking mode. This particular advantage is achieved by virtue of the fact that the triac 1', which is connected parallel to the armature 2, is actuated with a specific delay with respect to the first triac 1 which is connected in series with the universal motor.

The method described above will be explained in more detail with reference to FIGS. 3 to 5, wherein the same table of the program of the controller will preferably always be used for a phase-gating curve during the braking mode for actuating the triac 1, 1'.

Figure 3:
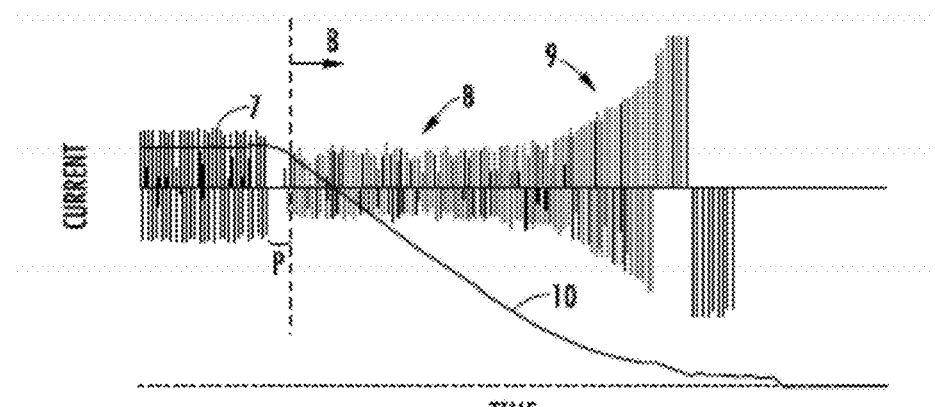
FIGS. 3 to 5 show recordings of current profiles during a motor mode and during a braking mode.

FIG. 3 shows a recording of a current profile during a braking mode. An idling mode of the universal motor is represented by gated full cycles 7 of a power grid. After a brief pause P, the braking mode B begins immediately, wherein the first and the second triac 1, 1' are actuated simultaneously with a program of the controller of the control electronics 5. In a first, two-thirds portion 8 of a braking time the power drain of the field winding 3 is approximately the same. This causes the brushes to spark to a great degree at the start of the braking mode, as a result of which the brushes burn away and the collector is damaged. In a last, one-third portion 9 of the braking time, the power drain rises again insufficiently.

From the recorded line of the rotational speed profile 10 it is apparent that at the start of the braking mode the braking is too strong and at the end it is too weak.

Figure 4:
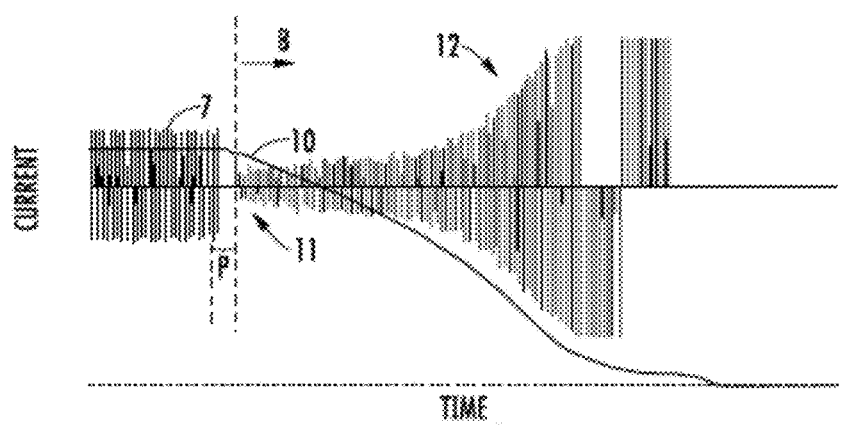

FIG. 4 shows a recording of a current profile during the braking mode B, in which recording the second triac 1' is actuated with a corresponding delay after the first triac 1, with the result that first a motor mode and then a braking mode preferably occur in each half cycle of the power grid.

At the start 11 of the braking time, the power drain of the field winding 3 is significantly lower with respect to that of FIG. 3, wherein the power drain increases slightly in the rest of the profile, and increases strongly in the last third 12 of the braking time.

Commutation at the collector of the universal motor is significantly improved with a delay of the actuation of the second triac 1', and the burning off of the brushes is already considerably reduced. From the rotational speed profile 10 it is apparent that the braking is weaker at the start of the braking mode and is then made stronger.

Figure 5:
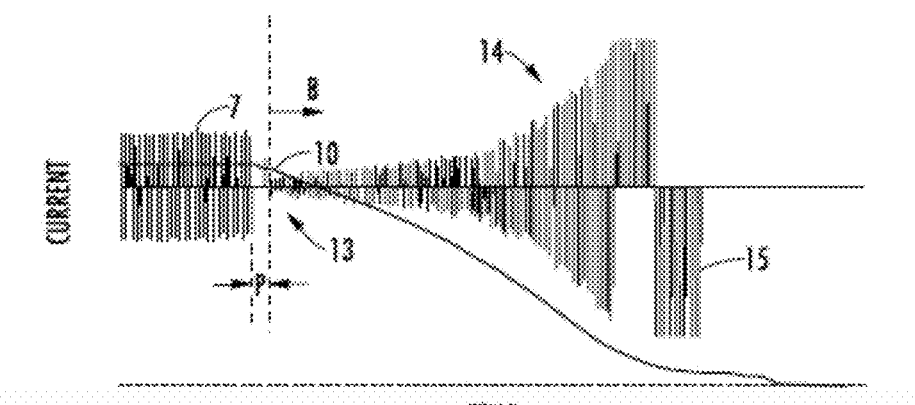

FIG. 5 shows a recording of a current profile during the braking mode, in which recording the second triac 1' is actuated with an optimum delay after the first triac 1, with the result that at first a sufficient motor mode for good commutation under the brushes is preferably present in each half cycle of the power grid, and subsequently the braking mode takes place, wherein the delay is selected such that the commutation under the brushes is moved, during the transition from the motor mode into the braking mode, from the trailing edge of the brushes to the leading edge, and as a result the sparking is considerably lowered, and the delay is also selected such that the armature is in principle not driven during the braking mode.

In FIG. 5, the power drain of the field winding 3 is even lower at the start 13 of the braking time than in FIG. 4, and in the rest of the profile there is a continuous moderate increase in the power drain, and toward the last third 14 the power drain increases correspondingly greatly to accelerate the braking profile. At the end of the braking time, half cycle packages 15 are applied to the field winding.

From the rotational speed profile 10 it is apparent that an optimum braking curve is achieved. At the start of the braking mode, the braking is initiated gently and continually made stronger in an overproportional fashion, and the braking dissipates gently at the end of the braking mode.

An unregulated braking mode can be used as a result of the delay in the actuation of the second triac 1'. A fixedly set phase-gating angle curve should therefore be used by means of a table of the program of the controller, since in a regulated braking mode an unsteady braking current profile could be present, and this could result in increased sparking of the brushes.

So that the current jumps during the braking mode can be kept small, with the result that the sparking is reduced, the phase-gating angle steps, for example from half cycle to half cycle of the phase-gating angle curve, will preferably be less than 1%.

In brushes which are becoming shorter, the pressure of the brushes onto the collector may no longer be sufficient for a predefined braking time, since the voltage of the short-circuited armature is no longer sufficient for this.

So that the braking time can be complied with again, the program of the controller of the control electronics 5 switches to a further table for the phase-gating angle curve, in which table the gating of the half cycles of the alternating voltage of the power grid is smaller.

A sufficient braking effect can either be determined by means of a shunt or detected by means of a rotational speed detection means.

The electrodynamic braking device can alternatively also be operated with direct current.

The program of the controller of the control electronics preferably has further tables for phase-gating angle curves, which each have smaller gating of the half cycles of the power grid.

Furthermore, a braking curve is preferably configured in such a way that braking is initiated gently at the start of the braking mode and is continually made stronger in an overproportional fashion, and dissipates gently at the end.

Figure 6:
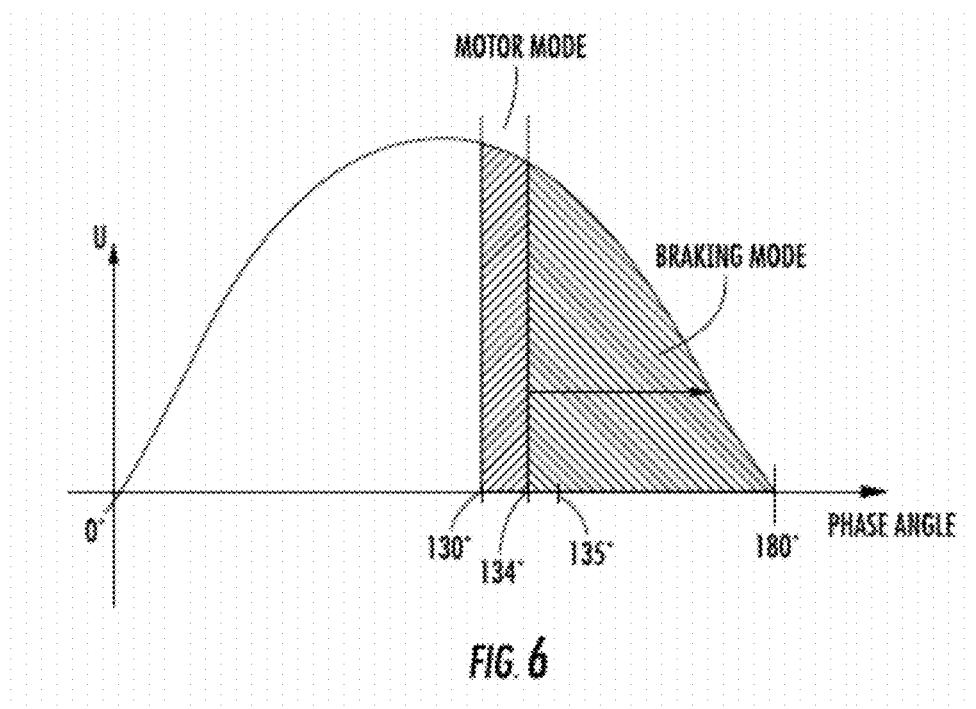
FIG. 6 shows a braking mode during a half cycle of the power grid voltage.

FIG. 6 shows a schematic illustration of a half cycle of the power grid voltage crossed against the phase angle of the power grid voltage of the power grid a, b in a braking mode of the universal motor. The basic idea of the invention consists in braking the universal motor in a non-damaging fashion with the aid of the power grid voltage. In this context, during the braking mode a motor mode is firstly briefly carried out and subsequently switching into the braking mode is effected. In the illustrated exemplary embodiment, at the phase angle of 130° the first switch 1 is energized, wherein the second switch 1' is still switched off. Subsequently, at a following phase angle of 134°, the second switch 1' is also energized, with the result that an actual braking effect is applied to the universal motor. In the time period between the phase angle of 130° and 134°, a motor mode is briefly carried out. After the phase angle of 134°, a pure braking mode is carried out, which ends, for example, at 180° phase angle.

Depending on the selected embodiment, the switch-on angle and therefore the switch-on time for energizing the first switch during a braking process varies as a function of various parameters such as, for example, the rotational speed of the universal motor, the temperature of the universal motor, a desired braking time and/or a desired gentle treatment of the brushes of the collector. In addition, the delay between the switching of the first switch for briefly setting a motor mode and the switching of the second switch for setting the braking mode also varies.

The delay between the switching of the first switch and the switching of the second switch may be, for example, in the range between a microsecond and a millisecond. For example, the delay may be between 1 microsecond and 5 microseconds or between 5 microseconds and 20 microseconds or between 20 microseconds and 50 microseconds or between 50 microseconds and 100 microseconds. Furthermore, the delay may be between 100 microseconds and 300 microseconds. Depending on the implementation, shorter times or longer times may also be used for the delay.

In a simple embodiment, the delay between the actuation of the first switch and the actuation of the second switch for briefly activating the motor mode and subsequently activating the braking mode for the entire braking process may be constant.

In a further embodiment, the delay between the switching of the first switch into a brief motor mode and the switching of the second switch for activating the braking mode during a braking process can depend on parameters of the universal motor such as, for example, the temperature, the rotational speed, the electrical properties such as, for example, the resistance R and the inductance L and the power grid voltage.

For example, the delay may be dependent on the power grid voltage at the time of the switching of the first switch and/or dependent on the rotational speed of the universal motor and/or dependent on the temperature of the universal motor. For this purpose, preferably empirically determined tables or characteristic curves are stored in a data memory and accessed by the control electronics.

The temperature of the universal motor and the rotational speed of the universal motor can be detected with the corresponding sensors 35 or estimated or calculated using operating parameters such as, for example, the current and the voltage.

Depending on the selected embodiment, the universal motor can be subjected to a braking mode with a brief preceding motor mode during each half cycle of the power grid voltage, as explained with reference to FIG. 6. Depending on the selected embodiment, the motor mode can be carried out here before the actual braking mode, for example in just one portion of the half cycles.

The control electronics are embodied in the form of a controller with a corresponding software program in order to carry out the actuation of the first and second switches. For this purpose, a memory is also provided in which the control program and control data such as, for example, tables for phase gating of the switches, that is to say the phase angles for the switching on and off of the first switch and the switching on and off of the second switch according to the braking mode in FIG. 6, are stored. In particular, tables and/or characteristic curves for the phase angles at which the first and/or the second switch are/is switched on and off are stored in the memory. The tables and characteristic curves may depend here on parameters of the universal motor and/or of the power grid voltage. In particular, the delay for the actuation of the second switch after the first switch during the braking mode can depend on the power grid voltage at the time of the switching of the first switch and/or the rotational speed of the universal motor and/or the temperature of the universal motor. For this purpose, corresponding tables and/or characteristic curves which have been determined empirically, for example, are stored.

Furthermore data may be stored which define a change in the phase-gating angles from half cycle to half cycle. For example, the change in the phase angles from one half cycle to the next half cycle for the energization of the first switch and/or for the energization of the second switch can be limited to a maximum value of, for example, one percent.

From FIGS. 3 to 5 it is apparent that, at the end of the braking mode, packages of half cycles of different voltage polarity follow one another. Therefore, for example only positive half cycles of the voltage power grid are used for defined time periods or a defined number of half cycles in order to carry out braking with a motor mode and a braking mode. Subsequently, a package of negative half cycles of the voltage power grid is used to carry out braking of the universal motor with a short motor mode and a subsequent braking mode, as is explained with reference to FIG. 6.

The invention claimed is:

1. An electrodynamic braking device for a universal motor, comprising:
 a device for switching from a motor mode into a braking mode,
  wherein during the braking mode a field winding of the universal motor is fed from a power grid voltage via a first and a second switch, and an armature of the universal motor is short-circuited via the second switch;
  wherein during the motor mode the first switch is energized and the second switch is switched off; and
 control electronics configured to, within each half cycle of the power grid voltage:
  activate the motor mode by energizing the first switch; and
  activate the braking mode by energizing the second switch with a delay relative to energized the first switch.

2. The electrodynamic braking device as claimed in claim 1, wherein the delay for actuating the second switch is configured in such a way that an actuation of the motor mode within each half cycle of the power grid voltage brings about a reduction in a sparking at a collector of the universal motor.

3. The electrodynamic braking device as claimed in claim 1, wherein the delay is between 1 μs and 1 ms.

4. The electrodynamic braking device as claimed in claim 1, wherein the delay for the actuation of the second switch after the first switch is constant for each half cycle of the power grid voltage.

5. The electrodynamic braking device as claimed in claim 1, wherein the delay for the actuation of the second switch after the first switch depends on parameters of the universal motor and of the power grid voltage.

6. The electrodynamic braking device as claimed in claim 5, wherein the delay for the actuation of the second switch after the first switch is dependent on at least one of the power grid voltage at the time of the switching of the first switch, a rotational speed of the universal motor, and a temperature of the universal motor.

7. The electrodynamic braking device as claimed in claim 1, wherein:
the delay for the actuation of the second switch at a first half cycle of the power grid voltage has a value, and
the value decreases in the further course of succeeding half cycles until reaching zero or to a quantity that is below zero such that the second switch is energized before the first switch.

8. The electrodynamic braking device as claimed in claim 1, wherein:
the delay for the actuation of the second switch is configured such that commutation under brushes at the collector of the universal motor during a first half cycle of the power grid voltage is moved from a trailing edge of the brushes to a leading edge within at least a portion of subsequent half cycles, and
the armature is not driven during the braking mode.

9. The electrodynamic braking device as claimed in claim 1, wherein the control electronics are configured to carry out the braking mode in an unregulated fashion.

10. The electrodynamic braking device as claimed in claim 1, wherein the control electronics access a table that stores:
phase-gating angles for actuating the first and/or the second switch; and
at least one phase-gating angle curve.

11. The electrodynamic braking device as claimed in claim 1, wherein:
during the braking mode the second switch is connected parallel to the armature and in series with the field winding and in series with the first switch, and
a switching element is connected upstream of the second switch, and includes a detection contact.

12. The electrodynamic braking device as claimed in claim 11, wherein:
the switching element is directly assigned as a signal generator switching element to the control electronics,
the first switch is arranged in a first power grid connection, and
a third switch is arranged in a second power grid connection.

13. A method for braking a universal motor having a device for switching the universal motor from a motor mode into a braking mode during the braking, comprising:
feeding a field winding of the universal motor from a power grid voltage via a first and a second switch, during the braking mode;
short-circuiting an armature of the universal motor via the second switch, during the braking mode;
successively activating a brief motor mode of the universal motor within each half cycle of the power grid voltage during the braking by switching the first switch; and
subsequent to the brief motor mode in each half cycle, activating the braking mode with a delay by switching the second switch.

14. The method as claimed in claim 13, wherein the delay between each switching of the first switch for activating the brief motor mode and the switching of the second switch for activating the braking mode is between 1 µs and 1 ms.

15. The method as claimed in claim 13, wherein the delay for the actuation of the second switch after the first switch during the braking is dependent on at least one of the power grid voltage at the time of the switching of the first switch, a rotational speed of the universal motor, and a temperature of the universal motor.

16. An electrodynamic braking device for a universal motor, comprising:
a power grid voltage;
a device for switching from a first mode to a second mode that includes:
a first switch configured to feed the power grid voltage to a field winding of the universal motor when switched on; and
a second switch configured to feed the power grid voltage to the field winding of the universal motor and short-circuit an armature of the universal motor when switched on,
wherein in the first mode, the first switch is switched on and the second switch is switched off, and
wherein in the second mode, the first switch and the second switch are switched on; and
control electronic configured to control the device, wherein within each half cycle of the power grid voltage:
the first switch is energized, activating the first mode; and
the second switch is energized with a delay relative to the first switch, activating the second mode.

* * * * *

UNITED STATES PATENT AND TRADEMARK OFFICE
CERTIFICATE OF CORRECTION

PATENT NO.       : 9,590,538 B2
APPLICATION NO.  : 13/518799
DATED            : March 7, 2017
INVENTOR(S)      : Hans Hermann Rottmerhusen It is certified that error appears in the above-identified patent and that said Letters Patent is hereby corrected as shown below:

In the Claims

In Column 8, Lines 51-53, Lines 16-18 of Claim 1 should read:

activate the braking mode by energizing the second
    switch with a delay relative to energizing the first
    switch.

In Column 10, Lines 42-44, Lines 17-19 of Claim 16 should read:

control electronics configured to control the device,
    wherein within each half cycle of the power grid
    voltage:

Signed and Sealed this
Sixth Day of June, 2017

Michelle K. Lee
*Director of the United States Patent and Trademark Office*